Aug. 15, 1967  H. W. DIETERT  3,336,007
SACK PORTER AND BLENDER
Filed Sept. 7, 1965
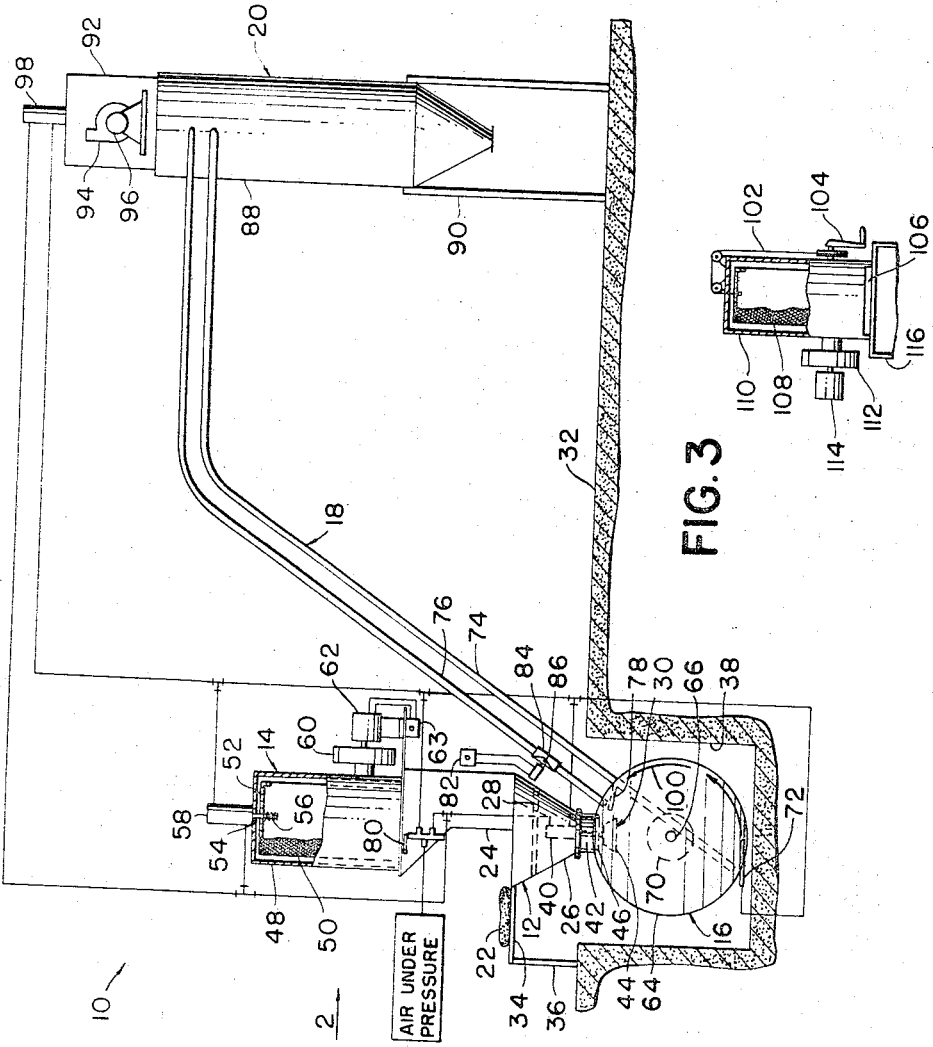
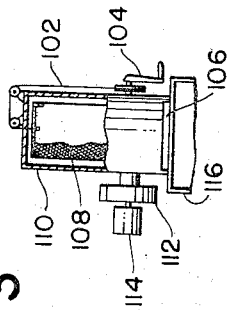
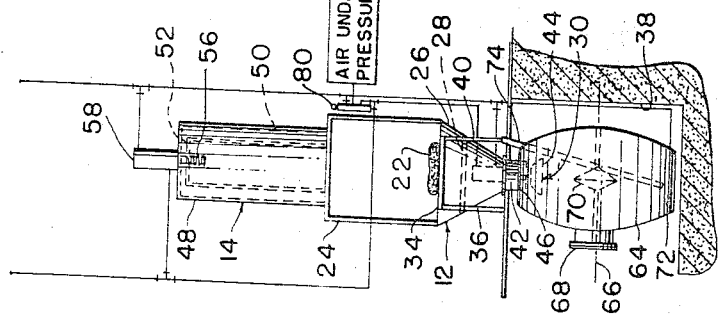
INVENTOR.
HARRY W. DIETERT
BY
ATTORNEYS United States Patent Office 3,336,007
Patented Aug. 15, 1967

3,336,007
SACK PORTER AND BLENDER
Harry W. Dietert, Kerrville, Tex., assignor to Harry W. Dietert Co., Detroit, Mich., a corporation of Michigan
Filed Sept. 7, 1965, Ser. No. 485,203
17 Claims. (Cl. 259—4)

ABSTRACT OF THE DISCLOSURE

Material handling apparatus including sack opening structure for sacks of powdered material, blending structure for receiving powdered material from the sack opening structure and blending powdered material of different types, storage structure for blended powdered material and transfer apparatus for transferring the powdered material from the blending structure to the storage structure wherein the blending structure comprises a cylindrical container having an axis of generation, pneumatic means for feeding air under pressure into the container substantially tangentially thereof and perpendicular to the axis of generation of the container, structure for venting the container without blowing powdered material out of the container, and means for splitting the powdered material during blending thereof in the blending structure.

---

In the foundry industry it is necessary to condition sand by the addition of additives thereto many of which are powdered materials which are normally purchased in paper sacks. It is often desirable to mix a variety of additives before conditioning a granular material therewith. The opening of the sacks and mixing of the powdered material may be a very dusty operation since the powdered material is usually very fine.

In the past, opening of the sacks of additives blending different additives and transporting the blended additives to a storage bin for future use has been carried out manually in a plurality of separate steps. A considerable amount of dust has thus been produced which is detrimental to the health of workmen and generally provides a messy sack opening, blending and storage area. While these operations have in the past been to some extent automated, no unitary, duct restricting system is known for opening the sacks of additives, blending the additives and transporting the additives to a storage bin.

It is therefore one of the purposes of the present invention to provide improved apparatus for opening sacks of powdered material, blending the powdered material and transporting the blended powdered material to storage bins.

Another object is to provide sack opening structure for opening of sacks of powdered material including a dust arrestor, a blender for powdered material of different types for receiving powdered material from the sack opening structure and for blending the different types of powdered material, a powdered material storage bin and means for transferring the blended powdered material directly from the blender to the storage bin.

Another object is to provide apparatus as set forth above wherein the dust arrestor comprises a hood over the sack opening structure, an air permeable dust bag within the hood, means for exhausting air from the hood through the dust bag and means for periodically shaking the dust bag for removing dust collected thereon.

Another object is to provide improved blending apparatus for powdered material including a cylindrical container, valve means within the container through which powdered material to be blended may be fed into the container, pneumatic means for introducing air under pressure into the container substantially tangentially of the container to circulate powderd material therein about the axis of generation thereof, exhaust means for exhausting the air under pressure from the container.

Another object is to provide a powdered material blender as set forth above and further including a disk having conical sides positioned centrally of the container on the aixs of generation thereof for splitting the powdered material in the container during circulation thereof by the air under pressure to increase the blending thereof.

Anotner object is to provide an improved dust arrestor.

Another object is to provide a dust arrestor including a hood, an air permeable dust bag within the hood, means for exhausting air having dust therein from the hood through the dust bag and means operable between the hood and bag for periodically moving the dust bag relative to the hood to remove dust from the dust bag.

Another object is to provide material handling apparatus as set forth above which is simple in construction, economical to manufacture and efficient in use.

Other objects and features of the invention will become apparent as the description proceeds, especially when taken in conjunction with the accompanying drawing illustrating a preferred embodiment of the invention wherein:

FIGURE 1 is a side elevation view of material handling apparatus constructed in accordance with the invention.

FIGURE 2 is an end view of a portion of the material handling apparatus 10 illustrated in FIGURE 1 taken in the direction of arrow 2 in FIGURE 1.

FIGURE 3 is an elevation view of modified dust arrestor structure which could be used in the material handling apparatus illustrated in FIGURES 1 and 2.

With particular reference to the figures of the drawing, one embodiment of the present invention will now be considered in detail.

The material handling apparatus 10 illustrated best in FIGURE 1 includes sack opening structure 12 including dust arrestor structure 14, and powdered material blender 16. Apparatus 18 is provided for transferring blended powdered material from the powdered material blender 16 into the storage structure 20.

In operation sacks of powdered material 22 are opened in the sack opening structure 12 with the dust created thereby being collected in the dust arrestor 14 and the powdered material falling into the powdered material blender 16. The material is then blended in the blender 16 and is transferred to the blended powdered material storage structure 20 through the powdered material transfer apparatus 18.

More specifically, the sack opening structure 12 is similar to that illustrated in applicant's copending patent application Ser. No. 384,694, filed July 13, 1964, now Patent No. 3,224,609, the disclosure of which is incorporated herein by reference.

The particular sack opening structure 12 includes the upper cylindrical housing portion 24 secured to the lower funnel-shaped housing portion 26 by convenient means such as welding. A grate 28 is positioned across the funnel-shaped housing portion 26 through which powdered material will pass out through the conical valve structure 30 into the blender 16 with the valve structure 30 opened. The grate 28 will retain the sacks from which the powdered material is poured into the sack opening structure in a position from which they may be readily removed from the sack opening structure.

As illustrated in FIGURES 1 and 2 the sack opening structure 12 is secured by convenient means, not shown, in a position above a floor 32 so that the apron 34, supported on the sack opening structure 12 and the vertical support members 36, is an easy lift from the floor 32 for an operator placing sacks of powdered material on the apron 34. A recess 38 is provided in the floor 32 to receive the powdered material blender 16 as will be considered in more detail subsequently.

The valve structure 30 includes a hydraulic piston and cylinder structure 40 secured within the funnel-shaped housing portion 26, a piston rod 42 connected to the piston and cylinder structure 40 for moving the conical valve 44 into or out of sealing engagement with the valve cylinder 46 secured to the bottom of the funnel-shaped housing portion 26.

Thus in operation with the conical valve 44 in an extended position as shown due to actuation of the piston and cylinder structure 40 to extend the piston rod 42 there is direct communication between the interior of the blender 16 and the funnel-shaped housing portion 26 of the sack opening structure 12. With the piston cylinder structure actuated to retract the piston rod 42 the conical valve member 44 will seal the lower end of the valve cylinder 46 to prevent communication between the sack opening structure 12 and the blender 16.

The dust arrestor structure 14 includes the cylindrical hood 48 which is secured to and in direct communication with the cylindrical housing portion 24 of the sack opening structure 12 through the top thereof. A dust bag 50 which may be of air permeable cloth supported on a metal disc 52 is suspended within the hood 48 by means of the piston rod 54 and the spring 56 secured between the end of the piston rod and the disk 52. The piston rod 54 is reciprocated by the piston and cylinder structure 58. An exhaust fan 60 is connected to the hood 48 while motor 62 is provided for driving the exhaust fan 60.

In operation, during opening and emptying of sacks of powdered material 22 into the sack opening structure 12 the dust created by the operation is drawn into the dust bag 50 by operation of the exhaust fan 60 to draw air from the interior of the sack opening structure 12 through the dust bag and out of the exhaust fan. During blending by the blender 16, the hydraulic cylinder 58 which has been actuated to withdraw the piston rod 54 whereby the dust bag 50 is held taut during emptying of sacks of granular material into the sack opening structure, is actuated to extend the piston rod 54 and allow the cloth bag 50 to collapse. The dust collected in the dust bag 50 is then returned to the sack opening structure 12 and falls into the funnel-shaped housing portion 26.

The blending structure 16 includes a cylindrical container 64, having an axis of generation 66, into which the valve structure 30 empties powdered material fed thereto when it is in an open position. The container 64 is positioned in the recess 38 in the floor 32 and an access door 68 is provided therefor. A disk 70 is supported centrally of the cylindrical container 64 and has conically shaped sides having the same axis of generaiton as the container 64.

A blending air supply conduit 72 shown best in FIGURE 1 extends into the container 64 substantially tangentially thereto through which blending air under pressure is passed into the container 64. The lower end of the transfer apparatus delivery tube 74 and vent tube 76 extend into the blending structure container 64 as best shown in FIGURE 1. The baffle 78 extends over the end of the vent tube 76 within the container 64.

In operation different types of powdered material will be fed into the blender 16 through the valve structure 30 after which the valve 44 will be closed and air under pressure passed through conduit 72 into the container 64. The air fed through the conduit 72 will enter the container 64 substantially tangentially thereof to produce rapid rotation of the powdered material within the container 64 whereby the powdered material will be fluidized. The disk 70 aids in splitting or breaking up the powdered material to produce more rapid mixing thereof on movement of the powdered material in the container 64. The baffle 78 prevents blowing of any appreciable amount of the powdered material in the conatiner 64 out through the vent pipe 76. The excess air in the container 64 is vented through the vent pipe 76.

After a blending cycle in the container 64 of for example 30 seconds the blended powdered material in the container 64 is transferred through transfer apparatus 18 into the storage apparatus 20. The transfer apparatus 18 includes the delivery tube 74 extending into the container 64 adjacent the bottom thereof and the vent tube 76 extending into the top of the container 64 above the baffle 78 as illustrated in FIGURE 1. After the blending cycle which is started and stopped by an operator on actuation of the hand pneumatic switch 80 an electric switch 82 is actuated by the operator to close off the sectionable portion 84 of the vent tube 76 by the hydraulic piston and cylinder structure 86. The air from conduit 72 thus builds up pressure in the chamber 64 sufficient to force the fluidized powdered material which has been completely blended through the delivery tube and into the storage structure 20.

The storage structure 20 includes the storage bin 88 positioned on the legs 90 over a weigh adder or volume adder such as disclosed in Patent No. 3,168,926. A dust arrestor 92 similar to the dust arrestor 14 and including the exhaust fan and motor 94 and 96 and the hydraulic actuating cylinder 98 are secured to the top of the storage bin 88. The dust arrestor 92 promotes dust-free transfer of the blended powdered material into the storage bin 88.

Thus in overall operation initially the manually operated pneumatic switch 80 which is connected to a source of air under pressure 99 is positioned to prevent air entering container 64 through air conduit 72 to cause valve structure 30 to be opened and to retract the piston rod 54 whereby the dust bag 50 is taut and extend a similar piston rod in the dust arrestor 92 to cause a similar dust bag to be in a collapsed position whereby dust thereon is returned to the storage bin 88.

With the apparatus in this condition an electric switch 63 connected to a source of electric energy, not shown, is energized to start the blower motor 62 and the fan 60. A plurality of sacks of different powdered material such as additives for foundry granular material are then opened by an operator on the apron 34 and emptied into the funnel-shaped housing part 26 of the sack opening structure 12 with the sacks falling on the grating 28 from which they are removed and the powdered material passing through the valve structure 30 by gravity into the container 64.

When the proper amount and mixture of powdered material has been passed into the container 64 the pneumatic valve 80 is actuated to close the valve structure 30 and introudce air into the container 64 through the air conduit 72 substantially tangentially of the container 64. At the same time the piston rod 54 is extended and the similar piston rod in the dust arresting structure 92 is withdrawn. The dust bag 50 in the dust arresting structure 14 is thus caused to collapse so that the dust collected thereon during the emptying of the powdered material into the container 64 is returned to the funnel-shaped housing portion 26 of the sack opening structure 12. The dust bag in the dust arresting structure 92 is drawn taut on a subsequent transfer of the blended powdered material in container 64 to the storage structure 20.

On introduction of air into the container 64 through the air conduit 72 the powdered material therein is blended due to circular movement thereof in the direction of arrows 100 in FIGURE 1 and the splitting action of the disk 70 positioned in the container 64. After the blending is completed in for example 30 seconds during which time the excess air in the container 64 has been exhausted through the vent tube 76, the pneumatic valve 82 is actuated by the operator and the pneumatic cylinder 86 which has previously been in an open condition is caused to close off the vent tube 76 by pinching the flexible portion 84 thereof. The air pressure from the conduit 72 thus builds up in the container 64 so that the fluidized blended powdered material is forced out of the container 64 through the delivery tube 74 and into the storage bin 88 of the storage structure 20.

The dust created by the transfer of the blended powdered material into the storage bin 88 is collected in the dust arrestor 92 after which the operator again actuates the pneumatic valve 80 to cut off the air supply to the conduit 72 to re-open the valve structure 30, retract the piston rod 54 to make the dust bag 50 taut and extend the similar piston rod in the dust arrestor 92 whereby the dust collected by the dust bag therein is returned to the storage bin 88 to complete a cycle of operation of the material handling apparatus 10.

A modification of the dust arresting apparatus 14 is illustrated in FIGURE 3. As shown in FIGURE 3 the hydraulic cylinder 58 of the dust collecting structure 14 may be replaced by a flexible cable 102 secured to a crank 104. A removable dust pan 106 is also provided. Thus in operation with the dust pan 106 removed and the dust bag 1008 held taut by the cable 102 tightened by the crank 104 dust is drawn into the dust bag 108 along with air drawn into the hood 110 through the dust bag 108 and exhausted from the exhaust fan 112 by actuation of the motor 114.

When it is decided to replace the dust collected in the dust bag 108 in the sack opening structure 116 the crank 104 is actuated to unwind the flexible cable 102 with the dust pan 106 positioned beneath the bag 108 so that the bag 108 collapses and the dust collected thereon is transferred to the dust pan 106. The dust pan 106 is then removed and the powdered material contained therein is replaced in the bag opening structure 116 and the dust bag 108 is again made taut by rewinding the flexible cable 102 by means of the crank 104.

While one embodiment of the present invention and a modification thereof have been disclosed in detail, it will be understood that other embodiments and modifications are contemplated by the inventor. It is the intention to include all modifications and embodiments of the invention as are defined by the appended claims within the scope of the invention.

What I claim as my invention is:

1. Material handling apparatus for opening sacks of powdered material such as foundry granular material additives including a cylindrical upper housing portion and a funnel-shaped lower housing portion connected together and in communication with each other and a grate positioned across the funnel-shaped housing portion, blending structure positioned beneath the sack opening structure including a cylindrical container, and pneumatic means for blending powdered material fed into the cylindrical container, means for venting the cylindrical container, means for splitting powdered material positioned in the cylindrical container of the blending structure, valve structure, valve structure positioned between the sack opening structure and blending structure for alternatively providing communication between the funnel-shaped portion of the sack opening structure and the cylindrical container of the blending structure nad sealing the communication therebetween including pneumatic actuating means therefor, storage structure for storing blended powdered material fed thereto from the blending structure including a storage bin, and transfer apparatus extending between the blending structure and storage bin including a vent pipe extending into the top of the cylindrical container and a baffle within the cylindrical container positioned over the end of the vent tube extending thereinto and a delivery tube extending into the cylindrical container adjacent the bottom thereof and into the storage bin and means for selectively pinching off the vent tube.

2. Structure as set forth in claim 1 and further including dust arrestor structure operably associated with the sack opening structure and storage structure for collecting the dust resulting from opening of sacks in the sack opening structure and returning the dust to the sack opening structure and for collecting the dust resulting from transfer of the blended powdered material to the storage bin and returning the powdered material to the storage bin respectively.

3. Structure as set forth in claim 1 wherein the means for splitting the powdered material in the container on blending thereof comprises a disc positioned centrally of the container and including conically formed side surfaces.

4. Blending structure for powdered material comprising a cylindrical container having an axis of generation, pneumatic means for feeding air under pressure into the container substantially tangentially thereof and perpendicular to the axis of generation thereof, structure for venting the container without blowing powdered material out of the container, pneumatic means for emptying the container and means for splitting the powdered material during blending thereof in the blending structure.

5. Structure as set forth in claim 4 wherein the means for splitting the powdered material within the container comprises a disc positioned centrally thereof having an axis of generation substantially parallel to the axis of generation of the container and having conical side surfaces.

6. Material handling apparatus comprising sack opening structure for opening sacks of powdered material, blending structure positioned adjacent the sack opening structure for blending a plurality of different types of powered material fed thereinto from the sack opening structure, storage structure for blended powdered material and transfer apparatus between the blending structure and storage structure for transferring blended powdered material from the blending structure into the storage structure, and dust arresting structure connected to the sack opening structure and to the storage structure for arresting dust produced during opening of sacks of powdered material and transfer of the blended powdered material to the storage structure.

7. Material handling apparatus for opening sacks of powdered material, blending powdered material from the opened sacks, storing the blended powdered material and transferring the blended powdered material to the point of storage, comprising sack opening structure including a housing into which split sacks of powdered material are emptied, blending structure positioned beneath the housing of the sack opening structure, including a cylindrical container, pneumatic means for feeding air under pressure into the container substantially tangentially thereof, structure for venting the container without blowing the powdered material out of the container, pneumatic means for emptying the container, means for splitting the powdered material during blending thereof in the blending structure, valve structure positioned between the blending structure and sack opening structure for alternatively permitting communication between the sack opening structure and the blending structure in accordance with the condition of actuation thereof, storage structure for the blended powdered material, and apparatus operable between the blending structure and the storage structure for transferring the blended powdered material between the blending structure and the storage structure.

8. Structure as set forth in claim 7, wherein the means for venting the container includes a vent tube extending from the top of the container and a baffle within the container extending over the end of the vent tube and wherein the pneumatic means for emptying the container includes a delivery tube extending into the bottom of the cylindrical container, a flexible portion in the vent tube and means for pinching the flexible portion of the vent tube closed.

9. Structure as set forth in claim 7 wherein the means for splitting the powdered material within the container comprises a disc positioned centrally thereof having conical side surfaces.

10. Material handling apparatus for opening sacks of powdered material, blending powdered material from the opened sacks, storing the blended powdered material and transferring the blended powdered material to the point of storage, comprising sack opening structure, including a housing into which split sacks of powdered material are emptied, a dust arrestor operably associated with the sack opening structure for collecting dust resulting from the opening of sacks of powdered material in the sack opening structure, including a hood positioned over the sack opening structure, a dust collecting bag suspended within the hood, means for exhausting air from the sack opening structure through the dust bag and out of the hood, means for periodically moving the dust bag with respect to the hood to remove dust from the dust bag, blending structure positioned beneath the housing of the sack opening structure, valve structure positioned between the blending structure and sack opening structure for alternatively permitting communication between the sack opening structure and the blending structure in accordance with the condition of actuation thereof, storage structure for the blended powdered material, and apparatus operable between the blending structure and the storage structure for transferring the blended powdered material between the blending structure and the storage structure.

11. Structure as set forth in claim 10 wherein the means for moving the dust bag with respect to the hood of the dust arrestor comprises a pneumatic cylinder and piston structure carried by the hood, a piston rod actuated thereby and resilient means securing the dust bag to the piston rod for movement therewith.

12. Structure as set forth in claim 11 wherein the means for moving the dust bag relative to the hood comprises a flexible cable secured to the dust bag and means for winding and unwinding the flexible cable to draw the dust bag taut or collapse the dust bag and further including removable dust pan means positionable over the bottom of the dust arrestor.

13. Blending structure for powdered material comprising a cylindrical container, pneumatic means for feeding air under pressure into the container substantially tangentially thereof, structure for venting the container without blowing powdered material out of the container, including a vent tube extending from the top of the container, and a baffle within the container extending over the end of the vent tube, pneumatic means for emptying the container, including a delivery tube extending into the bottom of the cylindrical container, a flexible portion in the vent tube and means for pinching the flexible portion of the vent tube closed, and means for splitting the powdered material during blending thereof in the blending structure.

14. Blending structure for powdered material comprising a cylindrical container, pneumatic means for feeding air under pressure into the container substantially tangentially thereof, structure for venting the container without blowing powdered material out of the container, including a vent tube extending into the container, pneumatic means for emptying the container, including a pneumatic conduit extending into the cylindrical container substantially tangentially thereof, means for feeding air under pressure through the conduit, a transfer tube extending into the container, and means for closing the vent tube, and means for splitting the powdered material during blending thereof in the blending structure.

15. Blending structure for powdered material comprising a cylindrical container having an axis of generation and convex ends, means for feeding powdered material into the container, means for feeding air under pressure into the container substantially tangentially thereof and perpendicular to the axis of generation of the container, a disc like member positioned centrally of the container having sides in the shape of flat cones having their apex on the axis of generation of the cylindrical container for splitting powdered material during blending thereof in the blending structure, means for venting the container without blowing powdered material out of the container, and means for emptying the container.

16. Structure as set forth in claim 15, wherein the means for venting the container comprises a venting conduit extending into the container, and a baffle positioned over the end of the venting conduit.

17. Structure as set forth in claim 16, wherein the means for emptying the container includes an exhaust conduit extending into the container, and means for closing the venting conduit.

References Cited

UNITED STATES PATENTS

| | | | |
|---|---|---|---|
| 1,153,751 | 9/1915 | Beth | 302—59 |
| 2,813,703 | 11/1957 | Kersten | 259—6 |
| 3,179,379 | 4/1965 | Grun et al. | 259—4 |
| 3,275,303 | 9/1966 | Goins | 259—180 X |

WILLIAM I. PRICE, *Primary Examiner.*

R. JENKINS, *Assistant Examiner.*